United States Patent [19]

Backhouse

[11] Patent Number: 5,240,359
[45] Date of Patent: Aug. 31, 1993

[54] MACHINING APPARATUS

[75] Inventor: Anthony E. Backhouse, Kew, Australia

[73] Assignee: Furmanite Australia Pty, Ltd., Carlton, Australia

[21] Appl. No.: 810,868

[22] Filed: Dec. 20, 1991

[30] Foreign Application Priority Data

Dec. 20, 1990 [AU] Australia .................. PK4008
Dec. 17, 1991 [AU] Australia .................. 89804/91

[51] Int. Cl.[5] .................................. B23C 1/20
[52] U.S. Cl. ........................ 409/178; 409/188; 409/193; 409/204
[58] Field of Search ......... 409/175, 178, 179, 184, 409/186, 188, 193, 195, 204, 207, 208

[56] References Cited

U.S. PATENT DOCUMENTS

| | | |
|---|---|---|
| 3,145,622 | 8/1964 | Rust . |
| 3,477,341 | 5/1971 | Rickenbrode . |
| 3,603,204 | 9/1971 | Anderson . |
| 3,608,172 | 9/1971 | Lindquist . |
| 5,044,844 | 9/1991 | Backhouse ............... 409/178 |

FOREIGN PATENT DOCUMENTS

| | | |
|---|---|---|
| 2318427 | 10/1974 | Fed. Rep. of Germany . |
| 2328703 | 1/1975 | Fed. Rep. of Germany . |
| 28443 | 2/1983 | Japan ................. 409/175 |

Primary Examiner—Daniel W. Howell
Attorney, Agent, or Firm—Sughrue, Mion, Zinn, Macpeak & Seas

[57] ABSTRACT

Machining apparatus comprises a boom displaceable along spaced rails and a carriage displaceable along the boom perpendicularly to the displacement direction of the boom. A machining station is adjustably supported on the carriage by three adjustment means to adjust a machine head, such as a milling cutter, towards and away from a workpiece disposed between the rails beneath the machining station. Adjustment of the machine head results from inaccuracies in the level of the rails and/or the displacement of the carriage. Variations in the level of the rails and/or carriage are determined by a respective sensor associated with each adjustment means which monitors a reference defined by a planar laser beam. Alternatively one of the three adjustment means between the machining station and the carriage may be replaced by a pivot with the third adjustment means being arranged to adjust the machine head relative to the remainder of the machining station. In an alternative embodiment, the boom is rotatable about a pivot support within a cylindrical workpiece with the machining station mounted on the remote end of the boom and optionally displaceable with a carriage along the boom. The boom is supported at its remote end on the workpiece by wheel units.

18 Claims, 18 Drawing Sheets

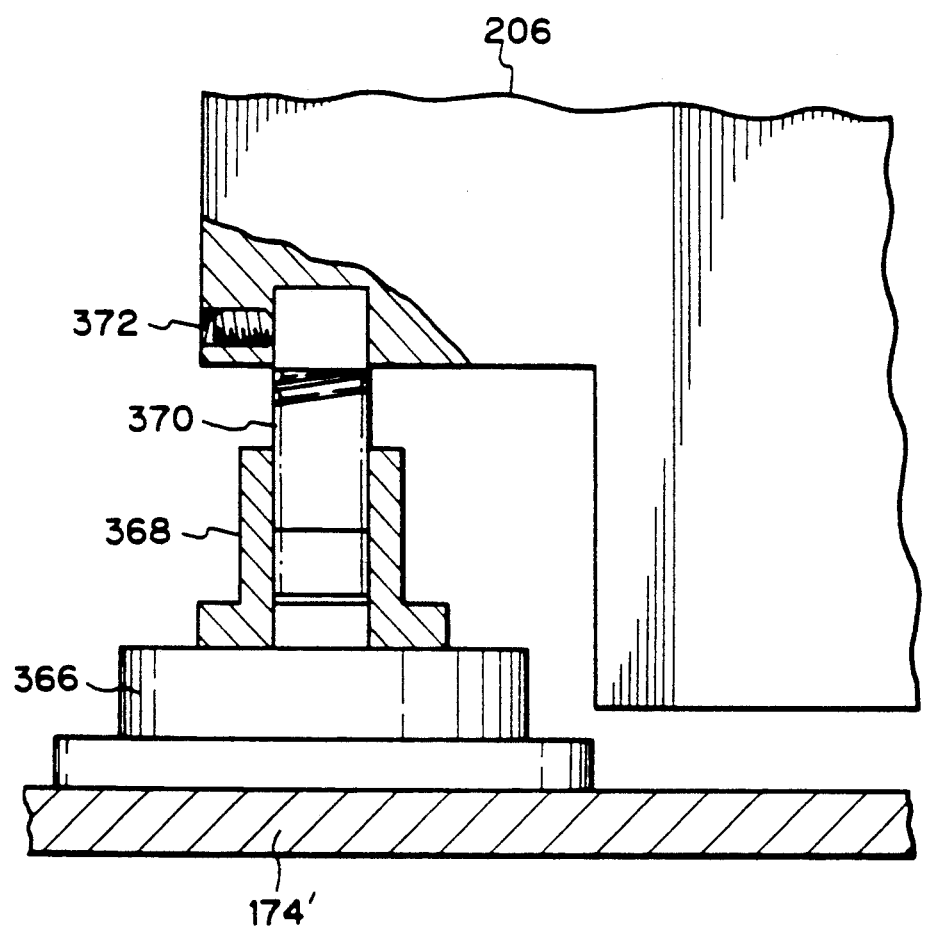

MACHINING APPARATUS

This invention relates to machining, especially but not only of metal, and in particular it relates to apparatus for the precision machining of such circular workpieces as draglines, pressure vessels and slew ring mounting faces and of non-circular workpieces such as turbine casings.

In the past it has been proposed to machine the edges of large circular workpieces such as draglines with a machine head mounted on the end of a pivoted boom. Rotation of the boom allows the machine head to machine the circular flange or end face of the dragline. Setting of the machine head relative to the surface to be machined has generally been achieved by guiding the free end of the boom along a precision clocked track adjacent the work surface. These arrangements have been inconvenient in that clocking of the track is difficult and time-consuming particularly as the work surface may be several meters in diameter. Similar considerations apply to the machining of workpieces using a machining head which is mounted for linear displacement along a boom which is itself linearly displaceable perpendicularly to the machining head. It is vital that the rails or other structure on which the machining head and boom are respectively displaceable are level and this is a particularly difficult and time consuming task. The tolerances which have been achievable hitherto are not acceptable today for many machining operations.

One proposal for machining large circular workpieces is described in U.S. Pat. No. 3,145,622. In this proposal a centrally pivoted boom carrying the machining head is supported at its outer end on the workpiece end face to be machined. The support is by roller assemblies on respective sides of the machining head and the roller assemblies are height adjustable by means of hydraulically actuated valves to maintain a desired level of the machining head. The valves are controlled together by means of a single level sensor adjacent the machining head which is displaced along a template which is secured to the inner wall of the workpiece to be parallel to the machined end face of the workpiece. The single level sensor is intended to sense a change in level of each roller assembly and to counter it.

In our U.S. Pat. No. 5,044,844 improved apparatus is described in which a boom having a machining station mounted thereon is supported on a support structure with a plurality of spaced displacement means being provided on the boom for displacement of the boom relative to the support structure through engagement with one or more support surfaces. The displacement means are associated with respective portions of the boom and each is independently adjustable to allow the associated portion of the boom to move towards or away from the support surface. The independent adjustment of each displacement means is controlled by a respective sensor monitoring movement of the associated portion of the boom relative to a reference to counter inconsistencies in the support surface so as to maintain the machining station at the desired level. Such apparatus has been found to alleviate many of the disadvantages of prior proposals and to allow very accurate machining of workpieces. However, such accurate machining tends to require fine adjustment in the displacement means, yet the displacement means must also be sufficiently substantial to support the associated portion of the boom. These contrary requirements lead to expensive components.

According to the present invention, there is provided apparatus for machining a workpiece, comprising a boom (as herein defined) supported on a support structure, displacement means on the boom for enabling displacement of the boom relative to the support structure along a support surface or a plurality of parallel support surfaces, a machining station carried by the boom by support means, and wherein the machining station support means comprises at least three adjustment means each of which is independently adjustable to move an associated portion of the machining station relatively towards or away from the support surface(s), the independent adjustment of each adjustment means being controlled by a respective sensor adapted to monitor movement of the associated portion of the machining station relative to a reference to counter inaccuracies in the support surface or surfaces as the boom is displaced therealong which would produce inaccuracies in machining by the machine head.

In one embodiment in which the apparatus is for machining a circular or annular workpiece, the boom is rotatable about a pivot support axially within the workpiece and the machining station is mounted on the boom remote from the pivot by way of the at least three angularly spaced adjustment means, each associated with a respective portion of the machining station. The support surface is conveniently, but not necessarily, the surface of the workpiece to be machined.

In this embodiment, the machining station support means may comprise a carriage which is displaceable along the boom to enable workpieces of different radii to be machined, respective portions of the machining station being adjustable relative to the carriage through the adjustment means. The adjustment means will then accommodate inaccuracies in the displacement of the carriage along the boom relative to the reference as well as in the support surface(s).

In another embodiment, which may be used for annular workpieces but which is suitable also for linear, elongate, plate-like and other surfaces to be machined, the boom is supported on a support structure, such as at least one pair of parallel rails, extending to one side or opposed sides of the workpiece and defining the support surface or plural support surfaces. The support means for the machining station may include a carriage which is displaceable along the boom, preferably substantially perpendicularly to the displacement direction of the boom along the support structure. The boom and/or the carriage could project beyond the support structure so that the machine head can work on the workpiece to one side of the support structure. The three or more adjustment means support the respective portions of the machining station for adjustment relative to the carriage. In this embodiment the boom is displaceable along the support surface(s) without pivotal movement about a separate support structure and the term "boom" as used herein should be construed accordingly.

By this invention, each of the portions of the machining station can be independently adjusted relative to the boom by the respective adjustment means under the control of the associated sensor. Accordingly, when a surface variation or other inaccuracy in the support surface is experienced by the displacement means as the boom is displaced, the sensors controlling the adjustment means can actuate one or more of the adjustment means to maintain the machine head, such as a milling head, at the desired spacing and orientation relative to the reference. The adjustment of one of the adjustment means may cause one or more of the sensors associated with the other displacement means to shift relative to the reference so that the other displacement means will then adjust.

The present invention thus facilitates machining the workpiece at the desired orientation and position in space without having to ensure that the support surface(s) is absolutely parallel to or has a predetermined relationship to the reference, by providing the three or more adjustment means each of which is associated with a respective portion of the machining station, each of the adjustment means being independently actuatable by a respective sensor. It will be understood that the spacing and/or orientation of the machine head relative to the reference may desirably be caused to vary as the machining station is displaced, for example to machine a non-planar surface on the workpiece, and that the terms "spacing" and "orientation" are therefore to be construed at any one time. Thus, the machine head may be controlled to machine parallel to the reference, for example in a horizontal or vertical plane, or merely relative to but not necessarily parallel with the reference.

Furthermore, the orientation of the machine head relative to the reference may desirably be caused to vary, for example to tilt the machine head, and this can be performed by adjusting some (including one) but not all of the adjustment means.

The reference against which displacement of respective portions of the machining station is monitored may comprise a precise beam such as may be emitted by a laser source in a plane which intersects with each of the sensors in use. The source of the beam may be centred on the pivot support in the rotating boom embodiment or be offset to one side of the workpiece. The beam may spread over the desired plane but more conveniently a narrow beam continuously sweeps the desired plane at high speed to effectively give continuous sweeping of the reference plane. The motion of a sweeping beam of energy could be by way of a motor drive displacing the source itself, a motorized mirror or refracting prism or, for example, a magnetic field. Alternatively, a stationary planar beam could be refracted via a prism. The beam source may be set up in well known manner to define the reference plane. Each sensor for use with a beam of energy may comprise, for example, a series of diodes, a divided diode or a plurality of light sensing cells. If necessary, each sensor may be rotated by, for example, a servo motor to always direct the sensor at the source of energy.

Alternatively, the displacement of respective portions of the machining station may be mechanically monitored by sensors each comprising a displacement transducer which engages a template or other mechanical reference. The template reference is especially, but not only, suitable for use with the rotating boom embodiment in which case it may comprise a setting point such as a beam pivoting off the pivot support but independently of the boom. However a convenient template for the rotating boom embodiment comprises an annular reference surface extending around the pivot support to allow the displacement transducers to engage successive sectors of the template as the boom rotates. The load imposed on a template by a displacement transducer will normally be very low so that a relatively lightweight and potentially easily levellable template plate may be used. Such a template may comprise a precision laid annular track of the type which may be supported on the workpiece. Other mechanical references may include an array of tensioned wires which are monitored by the sensors, but it will be appreciated that a mechanical reference may be other than planar and may be disposed other than horizontally.

The displacement means to support the boom may comprise one or more wheels or rollers to ride on the support surface(s), but other low friction means such as slides, including linear bearings, may be appropriate.

The machine head may comprise a metal milling cutter or other machining equipment such as a grinder, a borer, a buffer or a drill.

Each of the adjustment means of the machining station may take one of various forms such as a hydraulic actuator. However it is preferred that each adjustment means comprises a servo motor mechanically driving, either directly or for example through a reduction gearbox or belt drive, an adjuster such as a nut and screw assembly.

As explained hereinbefore, the at least three adjustment means, in conjunction with the respective sensors and the reference, allow not only a working plane but also the position of that plane to be defined at any one time. The position of the machine head may be fixed relative to the remainder of the machining station or may be fixed in use but separately adjustable during setting-up. In such an arrangement the at least three adjustment means would be associated with respective portions of the machining station other than the machine head. In an alternative embodiment, one of the adjustment means and the respective sensor is associated with the machine head itself so as to define the position of the working plane by adjustment of the position of the machine head relative to the remainder of the machining station. In this alternative embodiment, the support means comprises a pivot and the remaining adjustment means supporting the remainder of the machining station relative to the boom to define the working plane. The pivot positively locates the machining station relative to the boom or aforementioned carriage, except for the movement available through the adjustment means, and such an arrangement has particular advantage in situations of non-horizontal machining when the pivot can carry a substantial part of the mass of the machining station. This reduces bending moments in the adjustment means. Further reductions may be achieved by the use of resilient means, such as a spring, between the machining station and the boom or aforementioned carriage which tends to resist pivotal movement of the machining station about the support means pivot due to the mass of the machining station.

Various embodiments of apparatus in accordance with the invention will now be described by way of example only with reference to the accompanying drawings in which:

FIGS. 16, 17 and 18 are scrap sectional views showing three alternative adjustment means using a servo motor and a nut and screw adjuster assembly.

Figure 1:
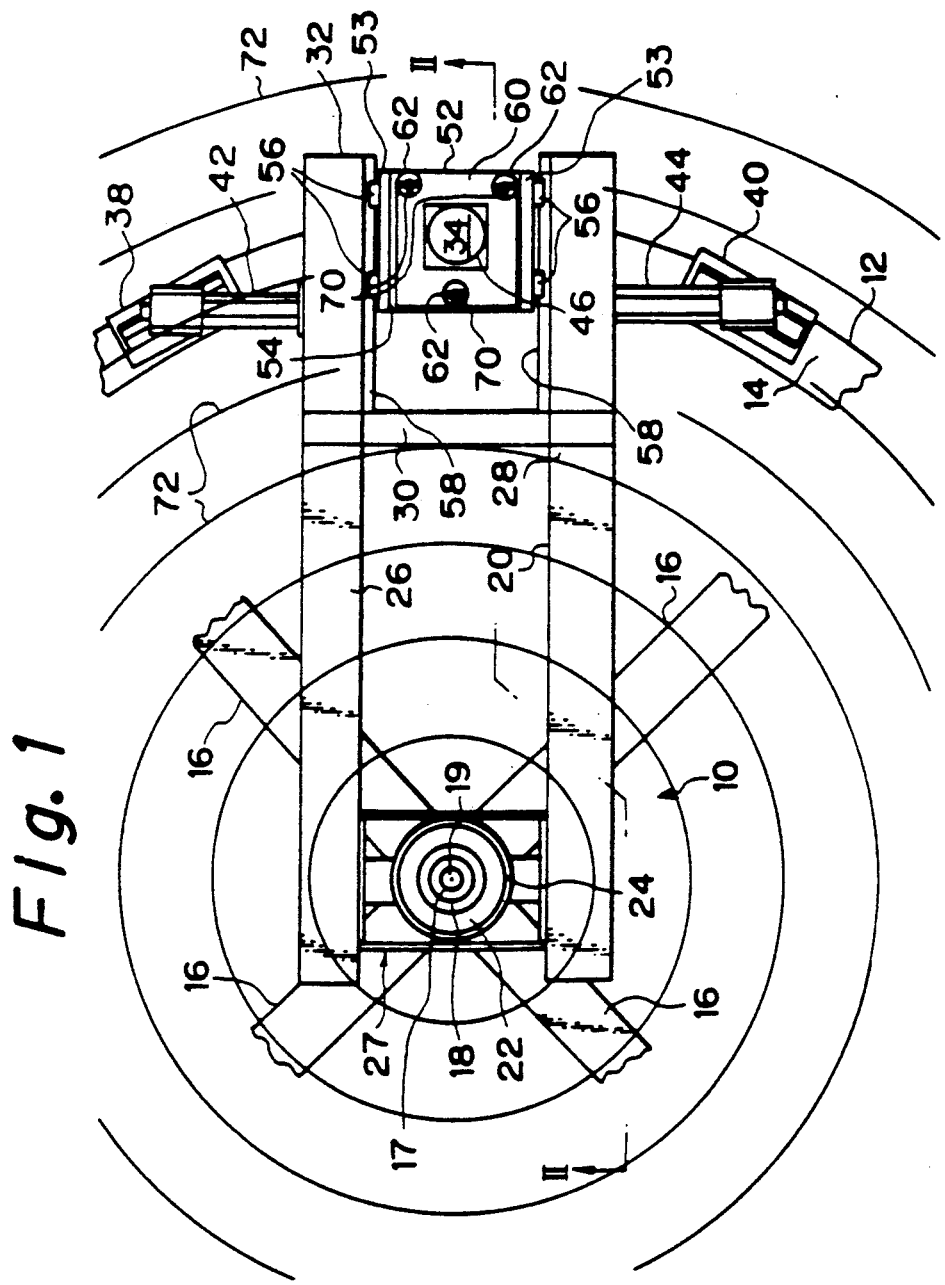
FIG. 1 is a schematic partial plan view of a first embodiment in use.
Figure 2:
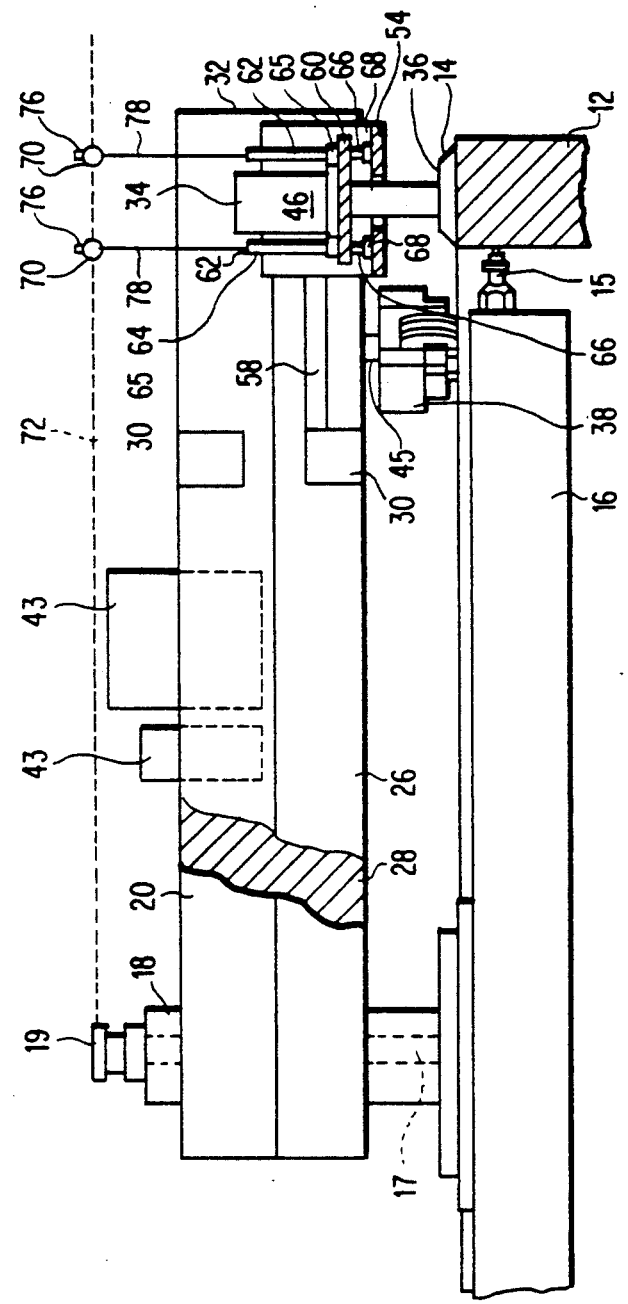
FIG. 2 is a schematic part-sectional side view of the embodiment of FIG. 1 taken on the line II—II of FIG. 1 and at a smaller scale.
Figure 3:
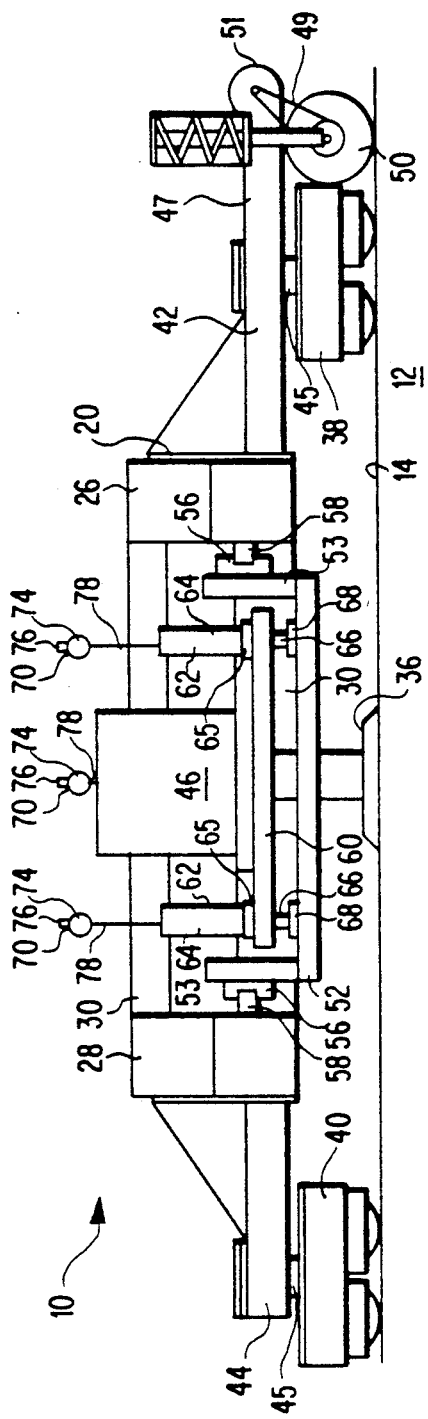
FIG. 3 is a schematic end view of the embodiment of FIG. 1 on a larger scale and with the pivot support means omitted for clarity.

Referring initially to FIGS. 1 to 3, the machining apparatus 10 is schematically shown in place within a circular workpiece 12 such as a 6 meter diameter slew ring having a top edge or flange defining a work surface 14 to be machined.

A spider of girders 16 extends across the interior of the workpiece 12 to locate a pivot support 18 of the apparatus 10 at the centre of the circular workpiece 12. The girders 16 may be welded at their radially outer ends to the inner wall of the workpiece, but as shown in FIG. 2 (one only) they are conveniently located by screw threaded studs 15 which extend to rigidly engage the workpiece and which are adjustable to centralise the pivot support. Two spaced studs 15 may be provided on each girder 16 to spread the load on the workpiece. The pivot support 18 is a vertically extending post which has an axial passage 17 therethrough to allow a plumb bob to be used to set the post relative to a datum. The pivot post is rigidly secured to the spider and setting the post vertical is achieved by jacking the girders of the spider. In an alternative arrangement the pivot post could be adjustable relative to the spider or other rigid support for the pivot post. The top of the pivot post is closed off, after it has been set up, by a laser beam source 19 which will be discussed below. The top of the pivot post 18 may be further adapted to support a dumpy level or theodolite (not shown) to allow checking of the work surface 14 and/or the plane of the laser beam from the centre.

A boom 20 is pivotally mounted on the pivot post 18 via a self aligning spherical roller bearing 22 engaging a collar 24 of the boom. The bearing 22 permits a degree of twisting of the boom 20 relative to the support post 18. Other forms of self aligning bearing may also be appropriate.

A pair of arms 26 and 28 of the boom 20 is rigidly secured to the collar 24 by a brace shown generally at 27 so that the arms extend from respective sides of the collar 24 parallel to each other in spaced apart manner. The arms 26 and 28 are also braced together along their length by one or more cross beams 30 to give torsional rigidity.

At the distal end 32 of the boom, a milling cutter machine 34 is located with its head 36 downwardly disposed to enable it to engage the work surface 14. Once in place, the machine head 36 is axially fixed relative to the remainder of the machining station 34. The distal ends of the arms 26, 28 are supported by respective wheel units 38 and 40 riding on the work surface 14. The wheel units 38 and 40 are connected to their respective arms 26 and 28 by associated brackets 42 and 44 extending laterally outwardly of the arms. The boom 20 is thus supported at three points—the pivot post 18 and the two angularly spaced wheel units 38 and 40 disposed on opposite sides of the boom to form a triangular arrangement with the milling machine 34 disposed between the arms of the boom.

The wheel units 38 and 40 each have two pairs of aligned wheels, the pairs being mounted in an angled arrangement such that the axis of each is on a respective radius from the pivot post 18. Having a plurality of wheels for each wheel unit assists in minimising marking of the work surface 14. Means (not shown) for adjusting the height of the wheel units relative to the boom independently of each other is provided in order to allow an initial gross setting of an appropriate height for the boom. This initial adjustment can be achieved by having a screw threaded mounting of a support shaft 45 to the respective brackets 42 and 44. Alternatively, or in addition to the screw threaded mounting, the brackets 42 and 44 may be bolted to respective arms 26 and 28 through elongate slots or multiple openings which enable vertical adjustment of the brackets relative to the arms.

A spring mounted electrically driven drive wheel 50 (FIG. 3) is mounted on a support arm 47 which extends rigidly from arm 26 of the boom to ride on the work surface 14 to displace the boom around the pivot post 18. This drive assembly has been omitted from FIGS. 1 and 2 for clarity only. The wheel 50 is rotated by means of a chain 49 driven by a reversible DC motor 51 and the spring mounting assists in maintaining the wheel 50 in contact with the surface 14. A modified drive assembly is described in our aforementioned U.S. Pat. No. 5,044,844 (or equivalent Australian Patent Specification 67633/90) whose contents are incorporated herein by reference. Such a modified drive assembly may be adopted in the present embodiment. Alternatively one of the wheel units 38 or 40 may be driven.

As shown for convenience only in FIG. 2, the boom 20 supports housings 43 for the various hydraulics and/or control circuitry to operate the milling machine and other systems of the apparatus 10. The housings 43 are mounted between the arms 26 and 28 in order to lower the overall configuration of the apparatus. These housings have been omitted from FIGS. 1 and 3 to aid clarity.

The cutter machine 34 comprises a motor 46 driving the cutter head 36 and is mounted on a carriage 52 having a base plate 54 and opposed wall members 53. The wall members 53 carry respective pairs of linear bearings 56 which engage opposed linear rails 58 mounted along the respective arms 26 and 28 of the boom 20. This arrangement enables the cutter machine to be displaced radially relative to the support post 18 according to the radius on which it is desired to perform the cutting action. For clarity no drive means for displacing the carriage along the boom has been illustrated. However it will be readily apparent that any one of many manual and driven means may be adapted. Preferred is a rack on each side of the carriage or on each arm 26 and 28 and a respective motor-driven pinion on the other of each side of the carriage and each arm for cooperation with each rack. Alternatively, the cutter machine may be fixed radially on the boom.

In use, the height of the wheel units 38 and 40 is fixed relative to the respective side of the boom 20 so that if either wheel unit engages an irregularity or other inaccuracy in the working surface 14 on which it is supported, the respective side of the boom, and the associated linear rail 58, will be moved out of the desired level. In order to counter such movement affecting the cutting action of the cutter head 36 the cutter machine is mounted on a support plate 60 of the machine 34 which is located on the base plate 54 of the carriage 52 by three independently adjustable support jacks 62 which are arranged about the support plate in a triangular array, preferably equally spaced about the cutter machine 34. More than three support jacks 62 may be used if desired, but three is preferred.

Each support jack 62 may comprise a hydraulic actuator substantially as described in the aforementioned U.S. Pat. No. 5,044,844 but as shown comprises an electric servo motor 64 driving a nut 65 in cooperation with a screw-threaded shaft 66 through a reduction system described hereinafter with reference to FIG. 16. The shaft 66 is located by a lock nut 68 mounted on the base plate 54 of the carriage. Alternatively the shaft may be driven by the motor 64 and the nut be secured to the base plate 54. Relative adjustment of the shaft and nut causes the associated portion of the support plate 60 to be raised or lowered relative to the base plate. Generally, the overall relative adjustment of the jacks 62 will be up to 5 mm or more but the adjustment may be to as small an increment as one micron or a fraction of a micron. It will be appreciated that the servo motor 64 may be DC or AC driven and could be replaced by a stepping motor.

Control of the jacks 62 is by means of respective sensors 70 reading off a reference defined by a beam 72 from the laser source 19 centrally located (of the apparatus 10) on the support post 18. A suitable laser source is available from Monochromatic Engineering of Melbourne, Australia or Hamar Laser Instruments, Inc. of United States of America. The laser source generates a beam of narrow diameter in the desired plane most desirably parallel to the flat surface to be machined on the workpiece. The beam 72 repeatedly sweeps the sensing zone to give a substantially continuous reference plane. During each sweep, each sensor will determine whether it is in the reference plane defined by the beam and will initiate an adjustment of the associated jack 62 in the appropriate direction if it is not. The motion of the beam is created by a motor driven rotating pentaprism which internally reflects a stationary laser beam through 90° (for example from a vertical axis to a horizontal axis) into the reference plane. Rotation of the pentaprism may be at any suitable speed, for example 300 rpm.

Each sensor 70 comprises a target mounted in a housing 74 for fine adjustment therein by means of a micrometer screw 76 in the direction of displacement of the associated jack 62. The sensor is supported from the associated jack by means of a stalk 78 and the micrometer screw 76 allows accurate centering of the target within the housing 74, for example to one micron or less.

Figure 7:
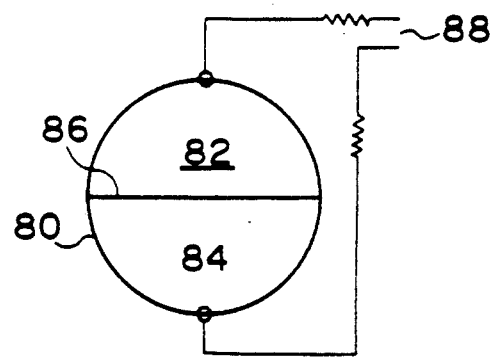
FIG. 7 is a schematic representation of one form of sensor.

Referring now to FIG. 7 each target 80 is manufactured by Hamar Laser Instruments Inc., USA, and comprises a single axis target containing a pair of silicon solar cells (light sensing cells) 82 and 84 whose output provides a signal corresponding to the relative position of the target centre line 86 in two directions to the plane of the laser beam. The two cells are separated by the centreline 86 which extends at least substantially parallel to the plane of the beam. The cells 82 and 84 are electronically bridged to give an indication of their position relative to the beam. If an equal amount of light energy from the laser beam is hitting the opposing cells there will effectively be a zero signal. If the target is positioned, for example, with more light hitting an upper cell 82 than a lower cell 84, a negative signal equivalent to the distance the centre line 86 of the target is lower than the centre of the laser beam 72 will result at the output 88. This signal may have a resolution of fractions of a millimetre for example as small as 1 micron or less. The single axis targets 80 can be furnished with integrally mounted calibration potentiometers so the sensitivity between cells of one target and between each other is the same.

Figure 4:
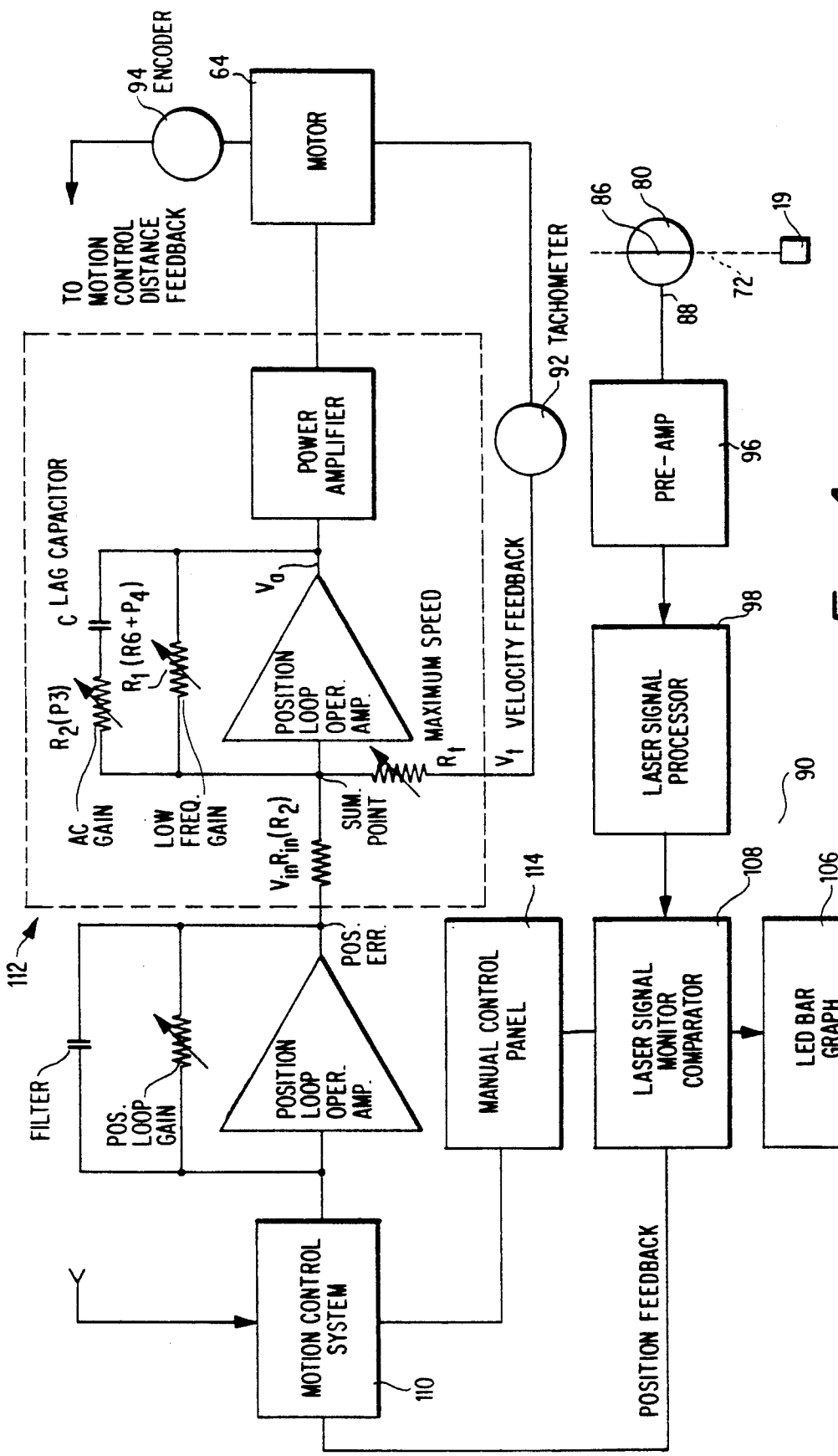
FIG. 4 is a general circuit diagram showing one embodiment for control of a servo motor of one adjustment means by a laser light sensor.

FIG. 4 shows a closed loop servo control system 90 associated with a respective one of the targets 80 and corresponding jack 62. Servo control is maintained by continual monitoring of the position error signal from the target due to the target being offcentre relative to the laser beam 72. The error signal, in conjunction with velocity and distance feedback signals from the jack servo motor 64 with included tachometer 92 and encoder 94, complete the servo loop. The motor 64 mechanically corrects the position of the laser target 80 to null the error. The tachometer 92 and encoder 94 provide digital feedback signals respectively as to the distance and velocity of correction of the error. Too fast a correction will tend to cause oscillation in the jack 62 while too slow a correction will never resolve the error.

Figure 5:
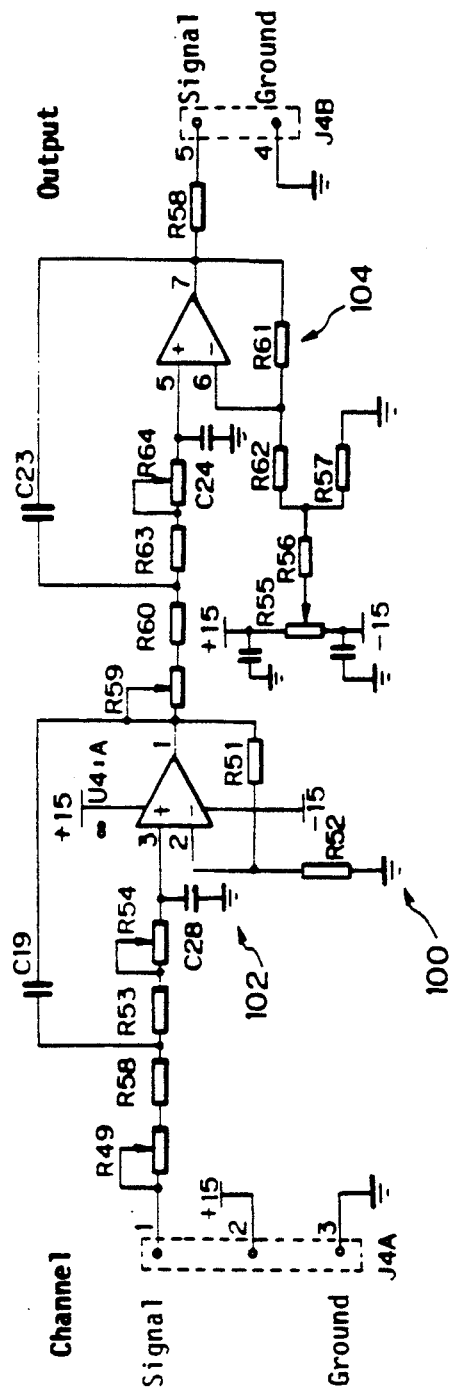
FIG. 5 is a detailed circuit diagram of the laser signal processor of the circuit of FIG. 4.

The signal from the laser target 80 is processed by a Laser Scanner Preamplifier 96 from Hamar Laser Instruments, Inc. to hold it until the next signal is received. The output from the preamplifier 96 is processed by a laser signal processor 98 comprising an integrating function amplifier 100 comprising an amplifier circuit 102 and an integrating circuit 104 illustrated in FIG. 5. The output from the processor 98 is an analog signal suitable to operate a set of light emitting diodes (LED's) in a linear bar graph 106 giving a visual indication of the relative position of the laser beam 72 on the target 80.

The analog output may operate a voltmeter instead of or in addition to the graph 106 or a digital output could operate a digital readout.

The LED bar graph 106 consists of 2 linear registers each of 10 red LED's with a central green LED. The green centre LED indicates the laser beam 72 on the target centre line 86, and the red LED's show beam deviation either side of centre. Plus or minus over-range deviation of the laser beam 72 is indicated by the relevant maximum value deviation red LED remaining on until the deviation is corrected.

The signal from the laser signal processor 98 is also fed to a laser signal Monitor Comparator 108, which outputs an appropriate digital signal to a motion control system 110 when either the set plus or minus threshold is exceeded. The motion control system 110 also has input from the encoder 94 and provides preprogrammed acceleration and deceleration ramps which are user selectable.

The motion control system controls a servo amplifier 112 and thereby the servo motor 64 which mechanically adjusts the jack 62 to null the error generated by the laser target 80. Positive or negative servo motor motion is indicated by either of 2 green LED's marked for the appropriate direction.

A push button panel 114 is also provided for manual control of the servo loop. This allows switchable control over the feedrate, incremental distance and direction, as well as an emergency stop circuit which disables the servo unit and stops any motion of the servo motor 64. The manual control facilitates setting up of the machine and may be remote, actuated for example by infra red or radio.

User selectable control is also provided in the automatic use mode for alternative servo loop performance parameters. This control allows compensation for laser light source-to-target variations due to changing air temperature and humidity.

Figure 6:
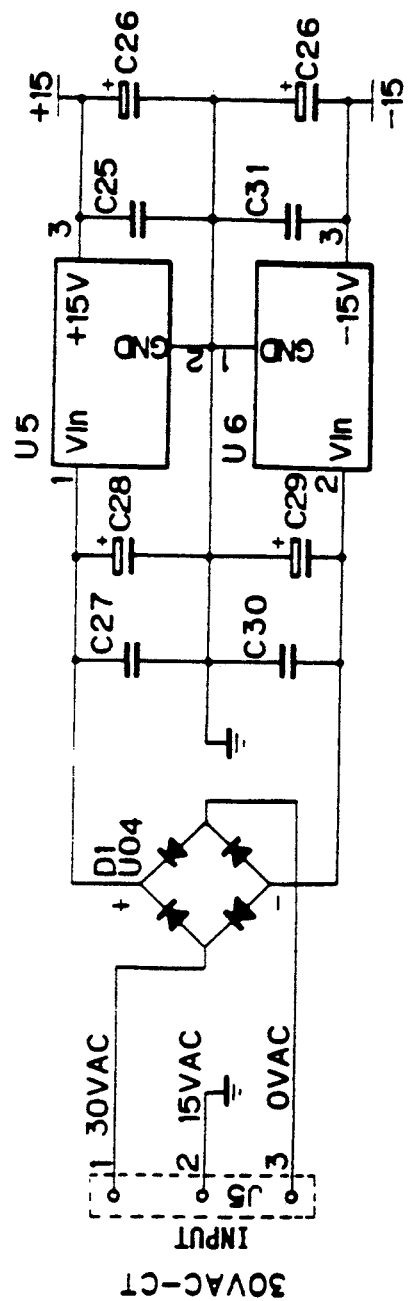
FIG. 6 is a power supply circuit for the circuit of FIG. 4.

FIG. 6 illustrates a circuit for converting a 30 volt AC power input to a plus and minus 15 volt DC input for components of the jack drive.

Referring again to FIGS. 1 to 3 the response signal from the light sensing cells 82 and 84 of each sensor 70 thus actuates the electrical circuitry 90 illustrated in FIG. 4 of the respective jack 62 to extend or retract the jack and raise or lower the support plate 60 relative to the base plate 54 and thereby maintain the cutting head 36 in the desired plane notwithstanding inaccuracies in the level of the working surface 14 on which the wheel units 38 and 40 ride. The jacks 62 are arranged in an equally spaced triangular array so that the displacement of one has minimal effect on the level of the portions of the support plate 60 associated with the others.

As indicated already, the electrical circuits for the jacks 62 are designed to function independently of each other but a potentiometer may be incorporated in the circuitry which enables the zero position (normal position) of each jack 62 to be varied in relation to the others so that by adjusting the potentiometer in one direction, the zero position of one of the jacks is extended or retracted while the zero position of the others is correspondingly adjusted to tilt the support plate 60. This enables the cutter, for example, to give a cross hatch on the work surface 14.

The control circuitry has a start sequence built into it such that once the laser beam plane 72 has been set the support plate 60 is set up on the screw jacks 62 to the desired plane by measuring the cutter plane. The support plate 60 is then set to the laser beam plane by adjusting micrometer screw adjusters 76 on each sensor 70 to zero output with a raise/auto switch in the raise position. The screw jacks are then adjusted to allow the cutter machine 34 to lower. The movement is indicated on respective voltmeters (and/or the bar graph 106) which act as error gauges and accurately show the error in distance that the associated target 80 is from its zero output point. The raise/auto switch is then moved to the auto position. The machine 10 then automatically adjusts itself, moving the jacks 62 to raise the support plate until the jacks 62 are displaced to give zero error on the voltmeters. The screw jacks can then be wound up as desired.

The control circuitry may be rendered safe from power failure by incorporating sufficient electrical capacity to allow the machine to hold its level until the cutting head 36 stops. The control circuit power may come from a sub switch on the motor 46 driving the milling head 36.

The plane of the sweeping laser beam 72 may be adjustable and may be set initially to the plane of best fit for minimum material removal or in a given plane. In the former case the plane may be adjusted with increasing material removal from the workpiece. Alternatively, the machine 34 may be adjusted to vary the response to a fixed reference plane.

A major advantage of the described system is the speed of setting up the apparatus. None of the apparatus 10 except the laser source 19 and sensors 70/jacks 62 need to be installed accurately and deflection errors in the boom 20 are eliminated.

If the laser beam source 19 is set radially outwardly of the workpiece it may be fixed and, for example, refracted by a prism to cover the desired plane but is preferably as previously described. If it is external to the workpiece it may be necessary for the sensors 70 to rotate, for example via a servo motor, to maintain the sensors directed at the laser source 19.

While the apparatus 10 has been described by reference to a laser beam reference generally perpendicular to the axis of rotation of the boom 20 defined by the support post 18, it will be readily apparent that the reference need not define such a planar surface for the work piece i.e. an inclined surface may be machined by the setting of an appropriate reference plane. Alternatively the reference may be defined by an array of wires or possibly by a template. Alternatively again, an electronic level associated with each jack 62 could be used as the reference.

Furthermore the machining head 36 of the apparatus 10 could be oriented upwards to machine the underside of a circular workpiece. Alternatively the machining head could be arranged to machine the interior wall of a circular work piece. The apparatus could be arranged to pivot about a non-vertical axis, for example horizontal or inclined, and the description of apparatus 10 should be construed accordingly.

In a further embodiment the apparatus 10 may be used as the basis of a portable or permanent floor mounted machine where the wheel units 38 and 40 ride on a track rather than the work surface. The support post 18 would be mounted in the centre of the track. If desired, the machine could then dress the track to at least substantially level but this should be unnecessary. Large bulky objects to be machined could then be placed on stands over the machine. The stands would be set outside the swing of the machine which may be adjustable. Attachments to the machine could allow different machining functions such as milling, boring, spigot cutting and drilling. A bracket could be mounted on the boom to carry the machining station so that it would be possible to machine elevated faces of the workpiece. Angles could be set using a theodolite mounted on the support post 18.

Figure 8:
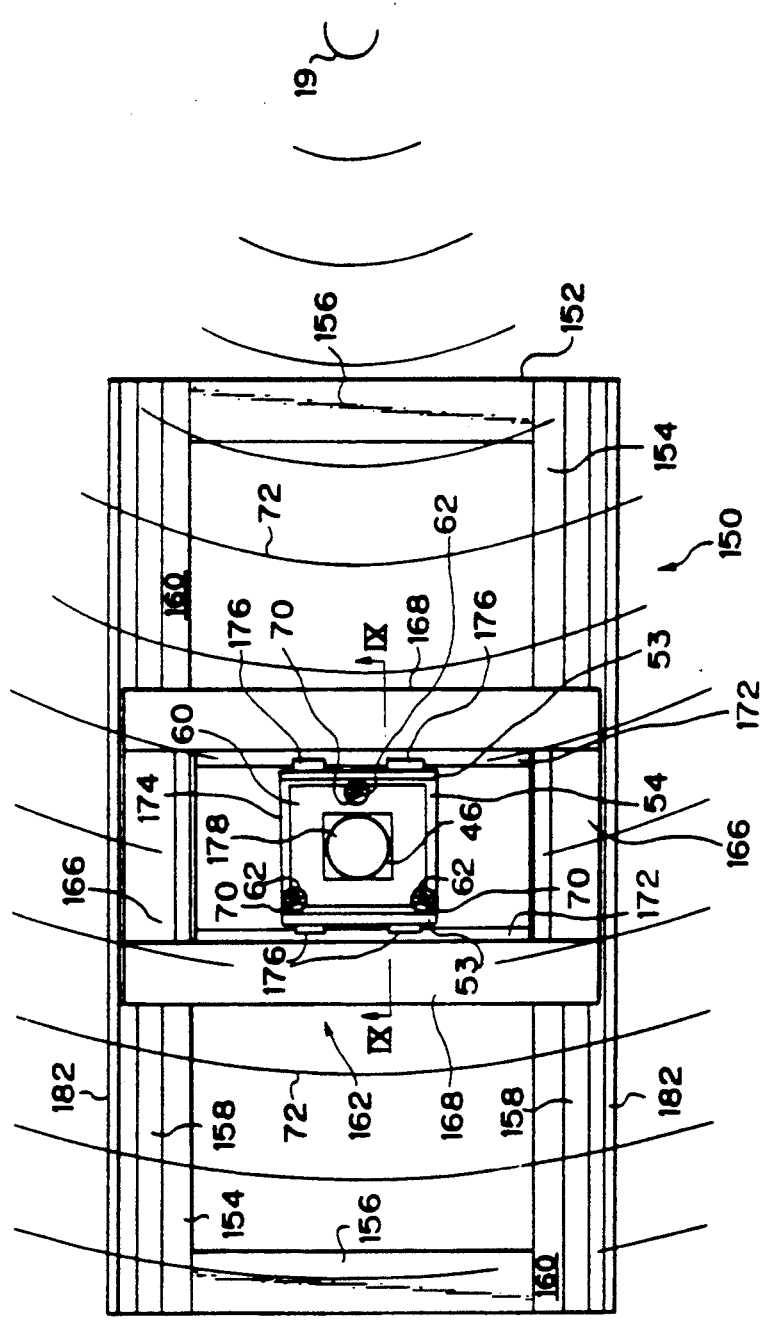
FIG. 8 is a plan view of a second embodiment of the invention.
Figure 9:
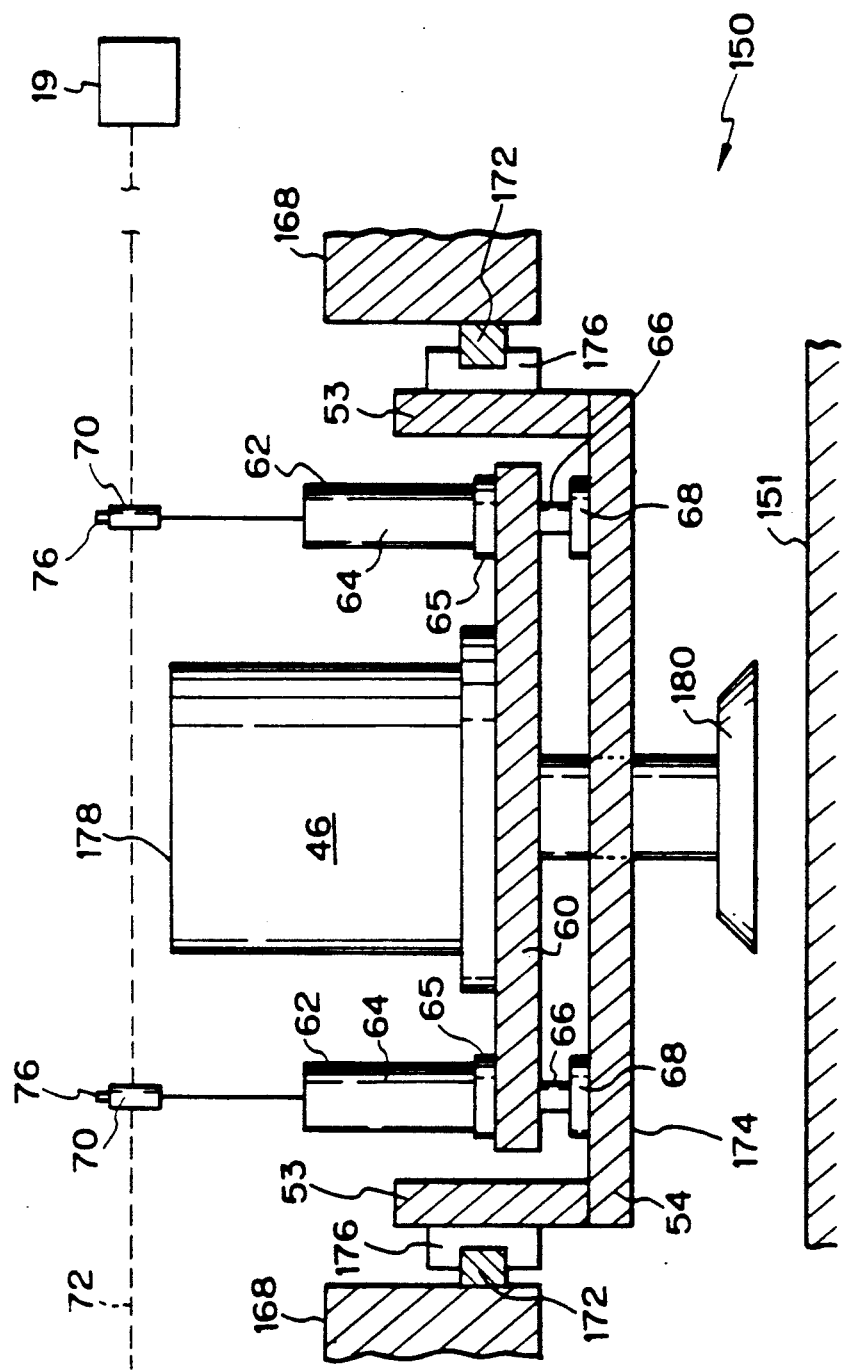
FIG. 9 is a sectional elevation on line IX—IX of FIG. 8, which is not to scale.
Figure 10:
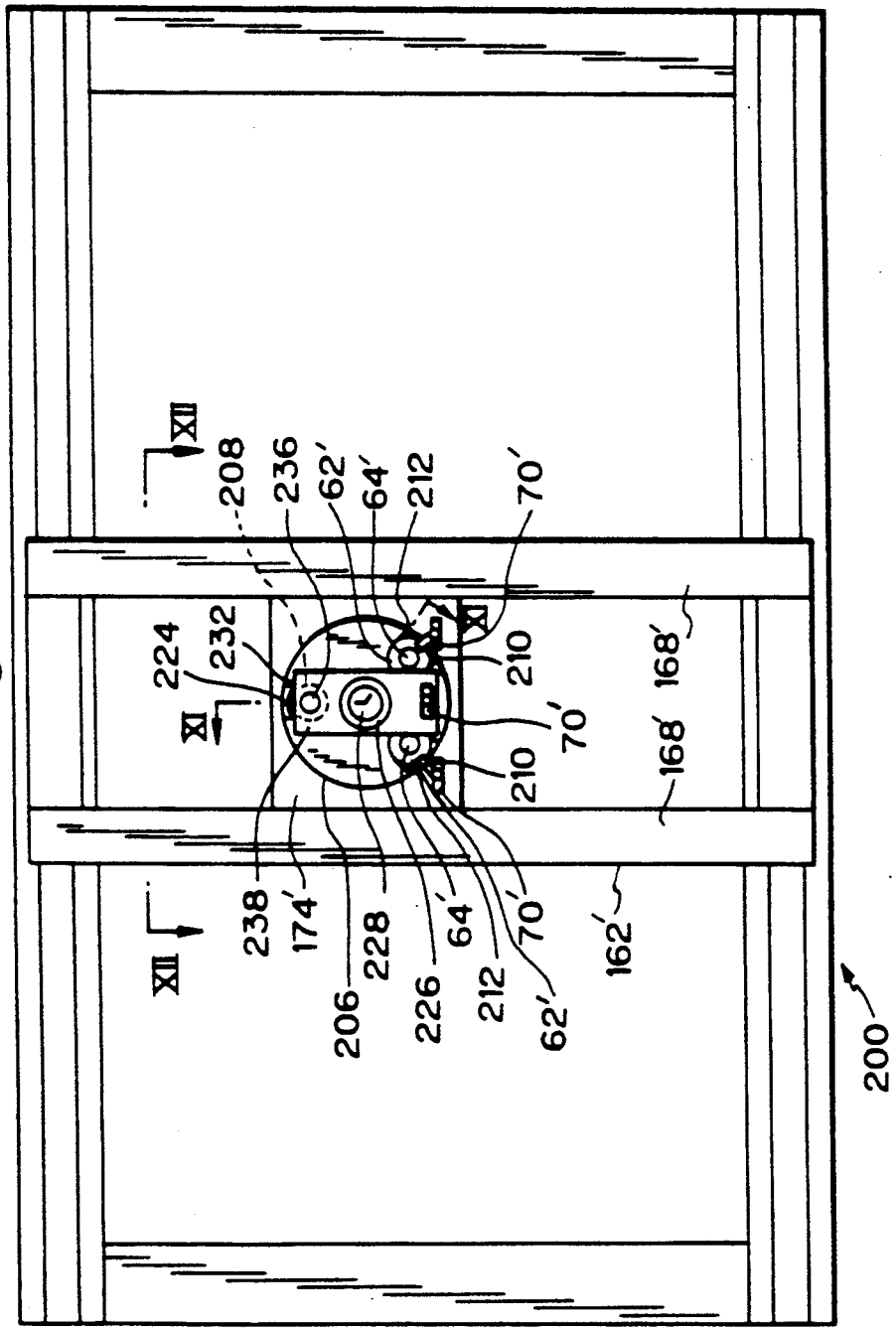
FIG. 10 is a view similar to FIG. 8 but showing a modification in which the machine housing is partially supported by a pivot and the third adjustment means is associated with the machine head.
Figure 11:
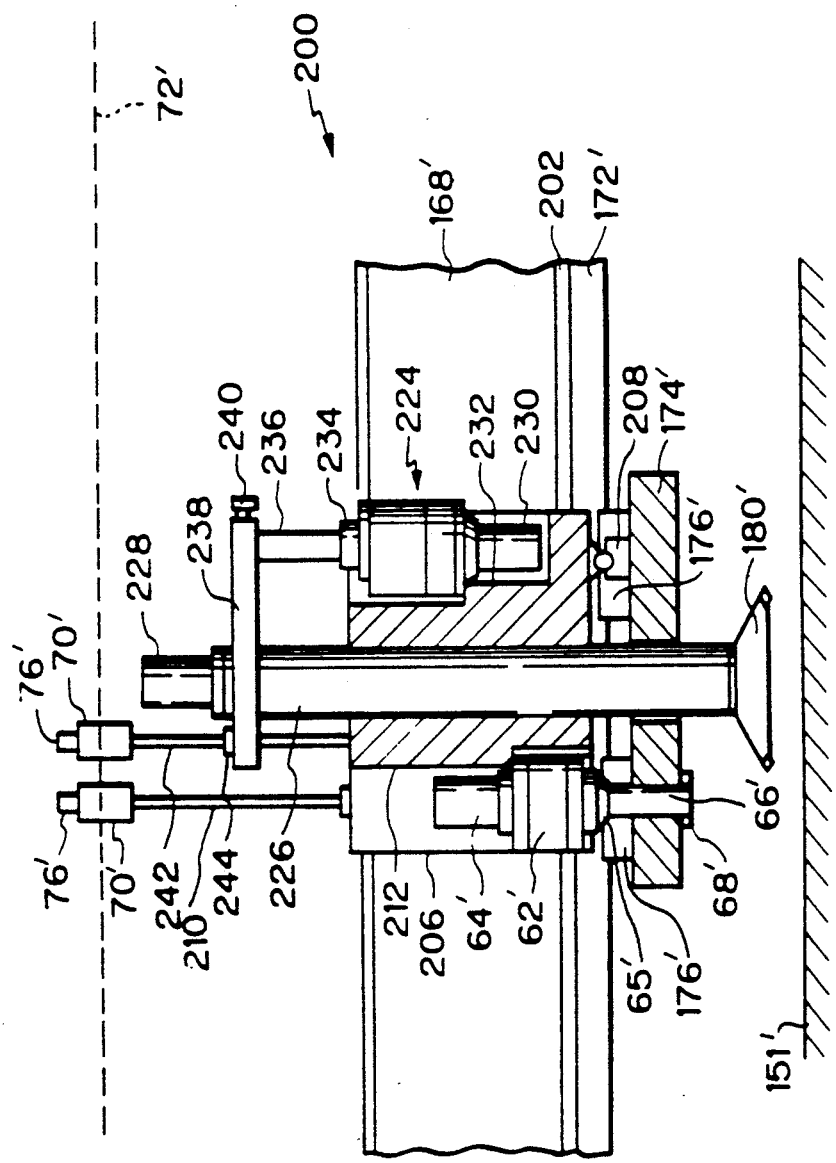
FIG. 11 is a sectional view of the modification of FIG. 10 taken on the line XI—XI.

Referring now to FIGS. 8 and 9, the apparatus 150 is capable of machining any workpiece 151 within a frame 152 defined by parallel spaced side beams 154 and parallel end beams 156 which extend between the adjacent ends of the side beams 154. The end beams 156 positively locate the side beams but may be omitted if the side beams are suitably secured by appropriate other means.

The side beams 154 comprise reinforced I-shaped beams and each carries a respective rail 158 on an upper flange 160 thereof. The rails 158, which are rigidly secured to the side beams 154, extend parallel to each other and carry a boom 162 displaceably thereon. Each rail 158 thus defines a respective support surface for the boom. The boom 162 is displaceably carried on the rails 158 by four linear bearings (not shown) at respective corners of the boom which closely envelop the rails 158 to positively locate the boom against lateral displacement relative to the rails. The linear bearings may be replaced by other low friction displacement units such as wheel or roller assemblies, but it is believed that they provide the optimum positive location of the boom.

Each pair of linear bearings per rail 158 is mounted on the respective ends of one of two longitudinal beams 166 of the boom, which two beams 166 are bridged by longitudinally spaced I-beams 168 which define parallel arms of the boom 162 extending perpendicularly to the rails 158 and to the floating beams 166 to which they are welded or otherwise fastened.

Each arm 168 of the boom has bolted to an inner face thereof a respective laterally extending linear rail 172. The linear rails 172 carry a machining carriage 174 by means of opposed linear bearings 176 engaging the rails 172. The machining carriage 174 carries a machining station 178 with a depending head 180 such as a milling head. Alternatively, the head 180 can project upwardly from the station 178 to machine an overhead workpiece.

The machining head 180 can machine a workpiece disposed within the frame 152, such as the edge faces of part of a turbine housing secured on a base and the machining head can be displaced to overlie any zone within the frame by displacement of the boom 162 along the rails 158 and/or by displacement of the machining carriage 174 along the perpendicularly extending linear rails 172. Displacement of the boom along the rails 158 may be by means of servo motors (not shown) mounted on the floating beams driving, preferably through wormboxes, pinions (not shown) engaged with respective racks 182 extending parallel to the rails 158. The servo motors facilitate computerised control. The drive arrangement may be much as described with reference to FIG. 3 except that the wheel or roller 50 is replaced by a pinion and that at least two are provided, one for each rack 182. A similar arrangement may be provided for the machining carriage 174, or the carriage 174 may be displaced by an electric motor/chain drive unit (not shown) associated with each lateral rail 172.

In order for the machining head 180 to machine accurately, it is important that it is maintained level (or in the desired plane) as the boom 162 and carriage 174 are displaced along their respective rails. Ensuring that the machining head 180 remains level or in the desired plane is performed by mounting the machining station 178 on the carriage 174 in the same manner as the cutter machine 34 described with reference to FIGS. 1 to 3 is mounted on the carriage 52. The sensors 70 in the apparatus 150 read off a laser beam 72 generated by a laser source 19 disposed to one end of the apparatus. The description hereinbefore of the adjustment of the cutter machine 34 and modifications thereto, applies equally to the adjustment of machining station 178 and for convenience will not be repeated.

In addition to the adjustment of the machining station 178, many of the features and options described with reference to the apparatus 10 are applicable to the apparatus 150, with appropriate modifications which will be clear to those skilled in the art, and the description of the apparatus 150 should be read accordingly. Further, the machining station may be supported from only one arm of the boom, or the boom may comprise only one arm.

FIGS. 10 to 13 illustrate a modification to the apparatus 150 of FIGS. 8 and 9. The modification relates primarily to the machining station and, for convenience, only this portion of the modified apparatus 200 will be described in detail. The same or similar parts of the apparatus 200 to the apparatus 150 will be given the same reference numeral as in FIGS. 8 and 9 but followed by a "'".

Figure 12:
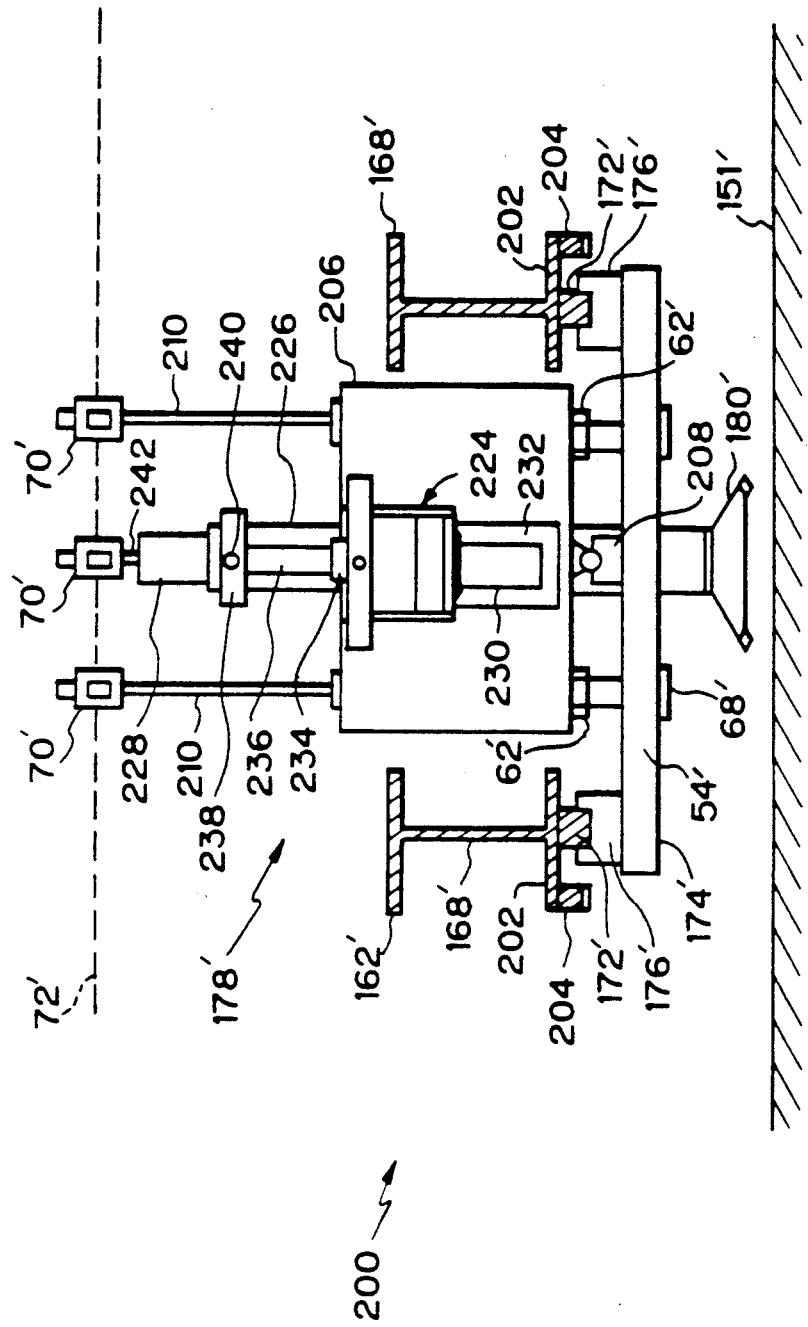
FIG. 12 is an elevational view, partly in section, taken on the line XII—XII of FIG. 10.

The other difference between the apparatus 150 and the apparatus 200 concerns the location of the lateral rails 172' on lower flanges 202 of the arms 168' of the boom 162', and the corresponding disposition of the co-operating linear bearings 176' on the base plate 54' of the carriage 174'. Racks 204 are illustrated in FIG. 12 also on the lower flanges 202 for co-operation with motor driven pinions (not shown) to provide positive displacement of the carriage 174' and machining station 178' along the boom 162'.

The machining station 178' of the machining apparatus 200 comprises a machine housing 206 which supports or from which are supported the various sensors 70', jacks 62' and servo motors 64', the machine head 180' and other drive mechanisms for the machine head. The machine housing is mounted on the carriage 174' by means of a fixed pivot 208 and two support jacks 62' (one only visible in FIG. 11) in a triangular array. The ball pivot 208 is illustrated schematically and may be replaced by a flexing rod pivot (not shown) in which the axis of the rod extends parallel to the displacement direction of the jacks 62' to reduce backlash in the pivot. Each of the two jacks 62' engaging the carriage 174' has an associated sensor 70' carried by a stalk 210 on the machine housing 206 to sense the laser reference beam. The sensors 70', jacks 62' and servo motors 64' are as previously described with reference to earlier embodiments although the jacks and servo motors are supported in stepped recesses 212 in the machine housing 206. One jack and servo motor assembly is shown in greater detail in FIG. 16 in which a static ball screw 66' is fixed relative to the carriage 174', by means of a lock collar 68' welded to the carriage, and projects upwardly therefrom to cooperate with a driven nut 65'. An adaptor plate 214 is bolted to a shoulder 216 of the stepped recess 212 and has the servo motor 64' bolted thereto. Drive from the motor is taken by a shaft 218 into a commercially available circular reducing gearbox 220 whose output drives the nut 65' through a spacer 222 which allows the requisite amount of adjustment of the jack 62', for example upto 5 mm.

The pivot 208 and two jacks 62' engaging the carriage 174' enable the plane of the machine head 180' to be defined by adjusting one or both jacks 62' to cause the machine housing including the head 180' to pivot about the pivot 208, but not the position in space of the working plane of the machine head 180'. This is achieved by means of a third jack 224 associated with the machine head and adapted to displace the machine head relative to the machine housing in a direction parallel to the adjustment direction of the carriage jacks 62'.

The machine head 180' has a shaft (not shown) which is rotatably supported in a quill 226 which is axially adjustable through the machine housing 206 and carriage 174'. Rotation of the machine head 180' is effected by driving the shaft through a hydraulic (or other) motor 228 bolted to the opposite end of the quill 226. For clarity of description bearings supporting the quill 226 for axial displacement in the housing 206 and the shaft for rotational displacement in the quill have not been illustrated.

Axial displacement of the quill 226 is effected by means of the jack 224 and a corresponding servo motor 230 which are mounted in inverted manner compared to the jack/servo motor assemblies 62', 64' in a corresponding stepped recess 232. The servo motor 230 and jack 224 for the quill 226 are as described with reference to FIG. 16 except that compared to the jacks 62' a substantially greater degree of axial adjustment is allowed by the jack 224 by providing an adaptor plate 214 appropriate dimensions. The jacks 62' may only require 5-10 mm of axial adjustment to set the working plane, whereas the quill 226 may require upto 150 mm or more of axial adjustment during setting up to position the working plane of the cutter head 180' in space. In use of the machine only a fraction of the adjustability of the jacks 62' and 224 will be used to maintain cutter head 180' in position.

The drive nut 234 of the jack 224 cooperates with a depending static ball screw 236 which is locked to a bracket 238 by a locking screw 240. The bracket 238 is bolted to the quill so that displacement of the ball screw 236 effects displacement of the quill. The bracket 238 extends beyond the quill and supports the associated sensor 70' in a manner shown in greater detail in FIG. 13.

In an alternative arrangement which may more readily facilitate the greater adjustability of the quill jack, the reduction gearbox may drive the ball screw and a fixed nut is secured to the bracket 238.

The sensor 70' for the quill 226 is as previously described, with a micrometer screw adjustment knob 76' for accurately positioning the target 80' within the target housing 74'. The target housing 74' is supported by an externally screw-threaded stalk 242 which engages a knurled and calibrated adjustment knob 224 carried by the bracket 238 via a thrust bearing 246. The stalk 242 projects through the thrust bearing 246 and bracket 238 and carries a bush 248 for sliding engagement in a linear passage 250 through the machine housing 206. A tension spring 252 extends in the passage 250 from the stalk 242 to a locating pin 254. The sensor 70' for the quill 226 and the stalk 242 are thus axially adjustable relative to both the bracket 238 and the machine housing 206, in a direction parallel to the displacement direction of the quill by means of the jack 224. The tension spring 252 may be replaced by other means to facilitate clean adjustment of the sensor, such as a linear rail in the passage 250 and linear bearing on the stalk 242.

During setting up, once the working plane of the machine head 180' has been defined by the jacks 62' adjusting according to the reference laser beam 72', the adjustment knob 244 is rotated to displace the stalk 242 relative to the bracket 238 and quill 226. Since the sensor 70' on the stalk 242 is "seeing" the laser beam 72', such displacement of the stalk 242 and sensor 70' will actuate the servo motor 230 to adjust the jack 224 and therefore the position of the quill 226 in the housing 206. The adjustment will continue until the sensor target is again giving the desired zero signal off the reference beam. Thus, the position of the working plane of the machine head 180' can be defined. By using an override button (not shown) the speed of adjustment of the quill during setting up may be accelerated compared to the adjustment during use of the machine. Furthermore, remote means may be provided for driving the adjustment of the quill sensor during setting up.

During machining, the coarse adjustment knob 244 is not adjusted and the quill sensor 70' causes small adjustments of the jack 224 to be effected as the machining station moves out of position as previously described with reference to the jacks 62. Although the three sensors 70' are shown in a triangular array, they may conveniently be disposed in a linear array to ensure none is in a shadow of one of the others from the laser beam 72'.

Figure 13:
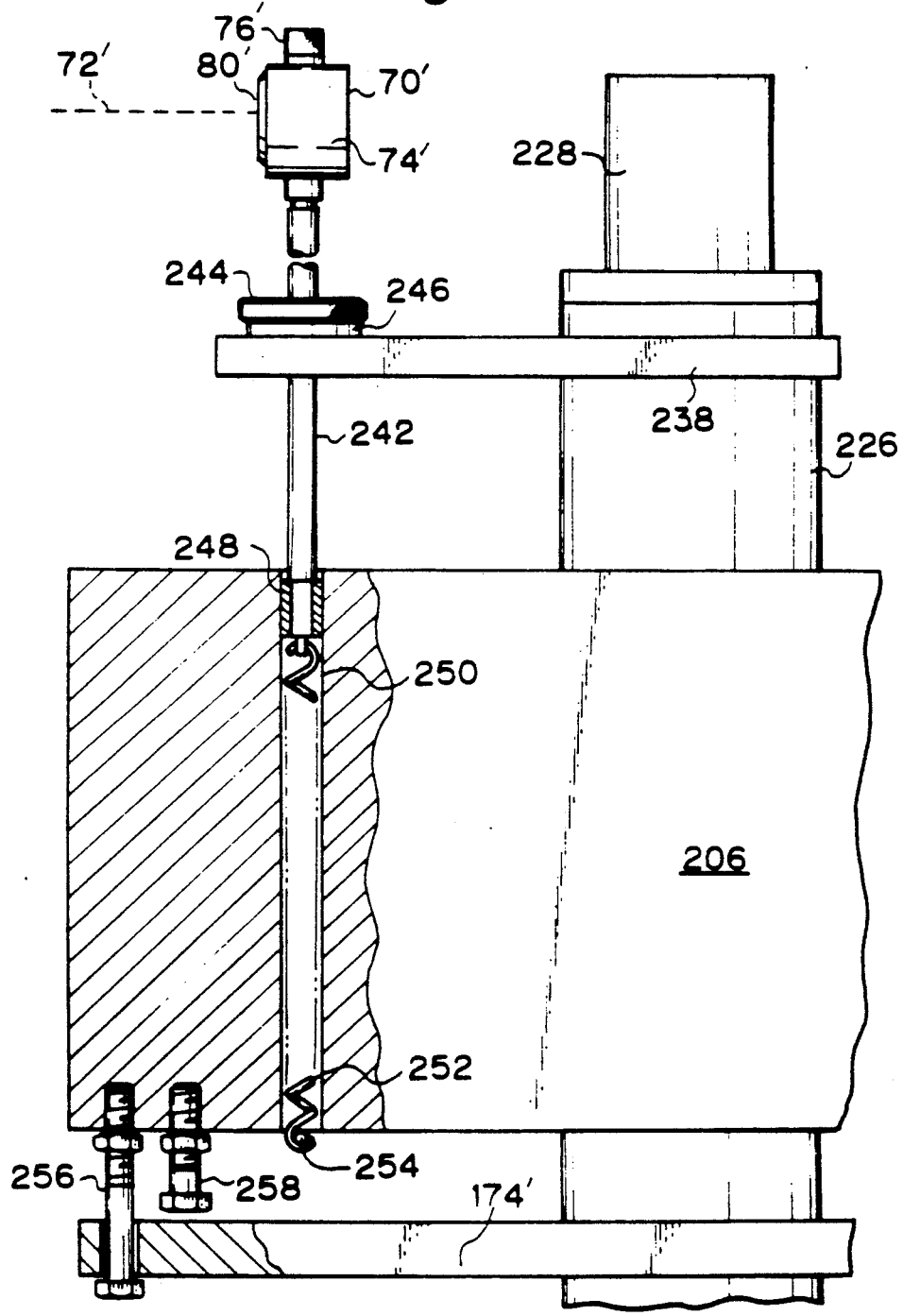
FIG. 13 is an enlarged view of part of the apparatus of FIGS. 10 to 12.

Also shown in FIG. 13, by way of example only, are stops 256 and 258 for limiting movement of the machine housing 206 respectively away from and towards the carriage 174'. Such a pair of stops would be associated with each of the jacks 62' or one pair of stops may be provided between the jacks 62', and would be appropriately located on the housing 206.

Although the modified machining station 178' of FIGS. 10 to 13 has been illustrated in association with the X-Y type of apparatus described with reference to FIGS. 8 and 9 it is also usable in the rotating boom embodiment of FIGS. 1 to 3.

Figure 14:
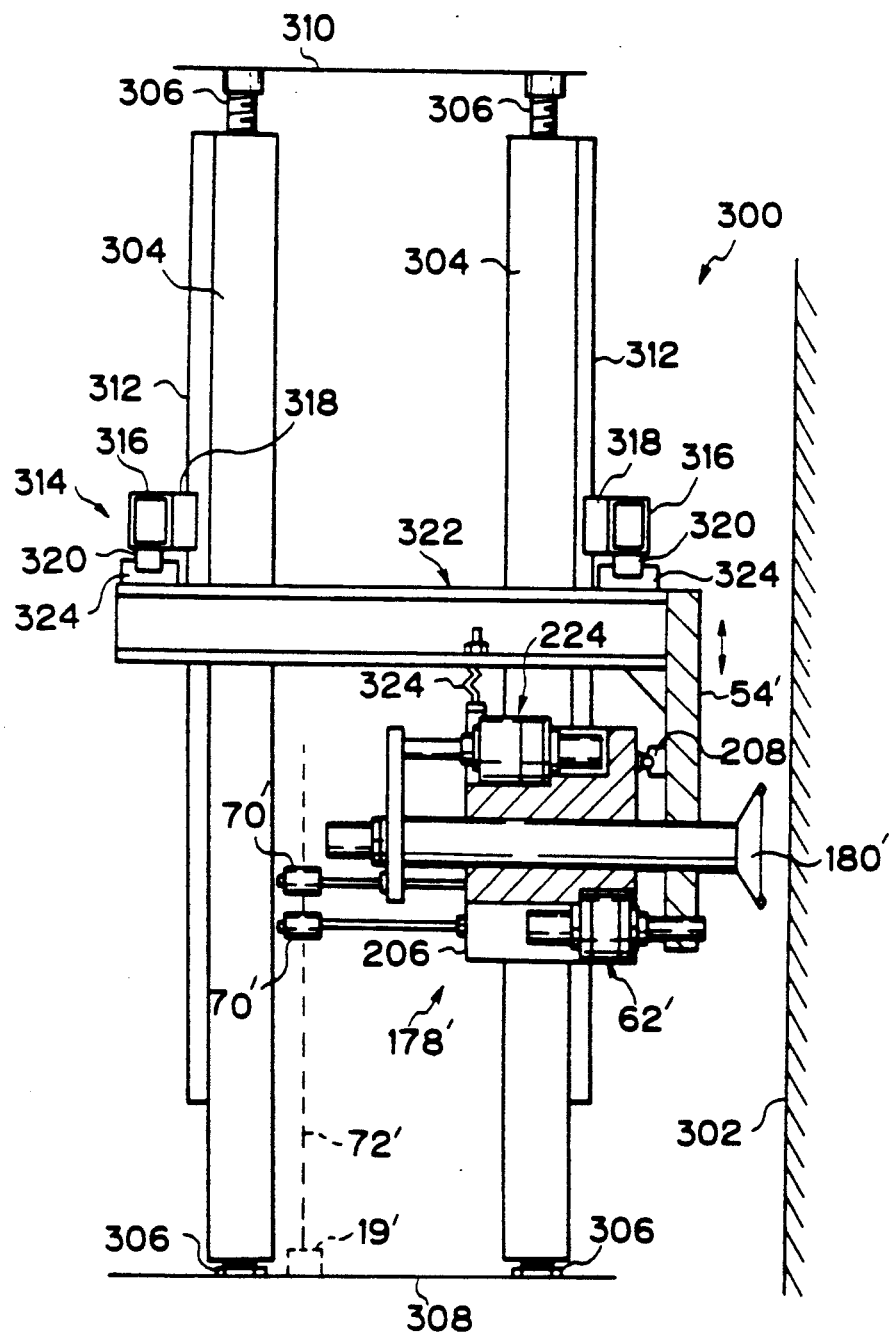
FIG. 14 is an elevational view, partially in section, of the apparatus of FIGS. 10 to 13 modified for use in vertical machining.
Figure 15:
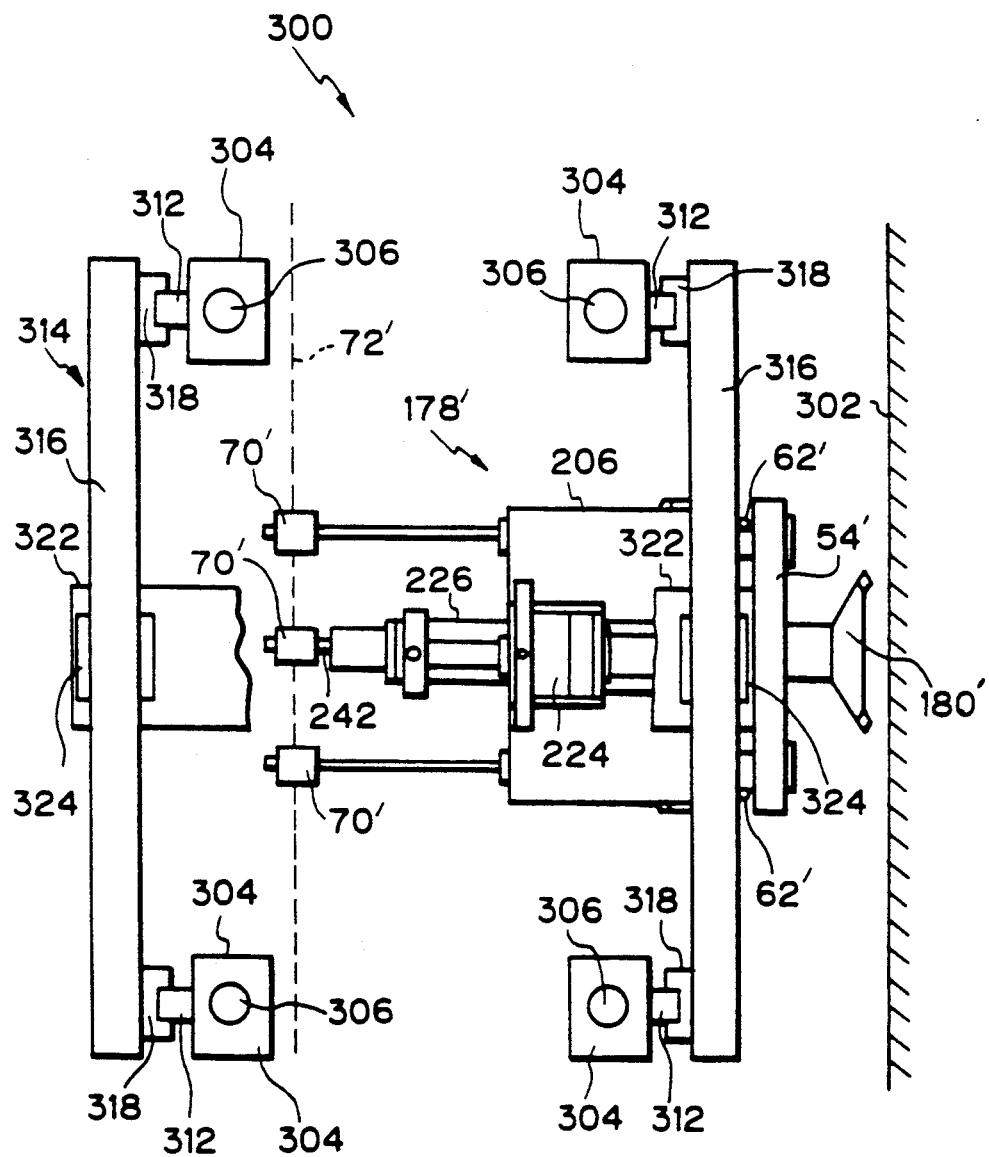
FIG. 15 is a plan view from above of the apparatus of FIG. 14 with parts deleted for clarity.

In FIGS. 14 and 15 the modified machining station 178' of FIGS. 10 to 13 is illustrated in apparatus 300 for machining a vertical or upright face 302 in which it has particular advantage because the pivot support 108 between the carriage and machine housing 206 can at least substantially carry the mass of the machining station 178'. Thus bending moments in jacks 62' are alleviated.

The apparatus in FIGS. 14 and 15 comprises four rigid upright support posts 304 securely positioned by screw adjusters 306 between the floor 308 and an overhead structure 310. Each support post has a rail 312 defining a respective support surface extending along an outer face thereof. A boom 314 comprises two spaced floating beams 316 carried on the rails 312 by means of linear bearings 318 and displaceable along the rails by means such as have already been described with reference to FIGS. 8 and 9.

The floating beams 316 of the boom 312 have respective under rails 320 which carry a carriage 322 comprising an I-beam by means of respective linear bearings 324, the carriage thereby being adjustable between the support posts 304 substantially parallel to the surface 302 of the work piece to be machined. Adjustment of the carriage 322 along the rails 320 is as described with reference to FIGS. 10 to 13.

The carriage has a base plate 54' depending therefrom outwardly of the support posts 304, between the posts and the surface 302 to be machined, to which the pivot 208 and carriage jacks 62' are mounted so that the jacks 62' and the quill jack 224 are adjustable to displace the machine head 180' of the machining station 178' towards and away from the support surfaces defined by the rails 312 of the support posts 304. For machining a vertical surface 302, the base plate 54' of the carriage 322 supports the machining station 178' for adjustment of the jacks 62' and 224 substantially along respective horizontal axes.

A spring 324 extending between the carriage 322 and the machine housing 206 of the machining station 178' supports part of the mass of the machining station to further alleviate bending moments in the support plate jacks.

The laser source 19' in FIGS. 14 and 15 (not visible in FIG. 15) presents the laser beam 72' to the sensors 70' of the three jacks 62' and 224 from beneath the machining station 178'. Generally the beam 72' will extend in a plane substantially parallel to the floating beams 316 of the boom 312 but may be adjusted if desired as previously described.

Figure 16:
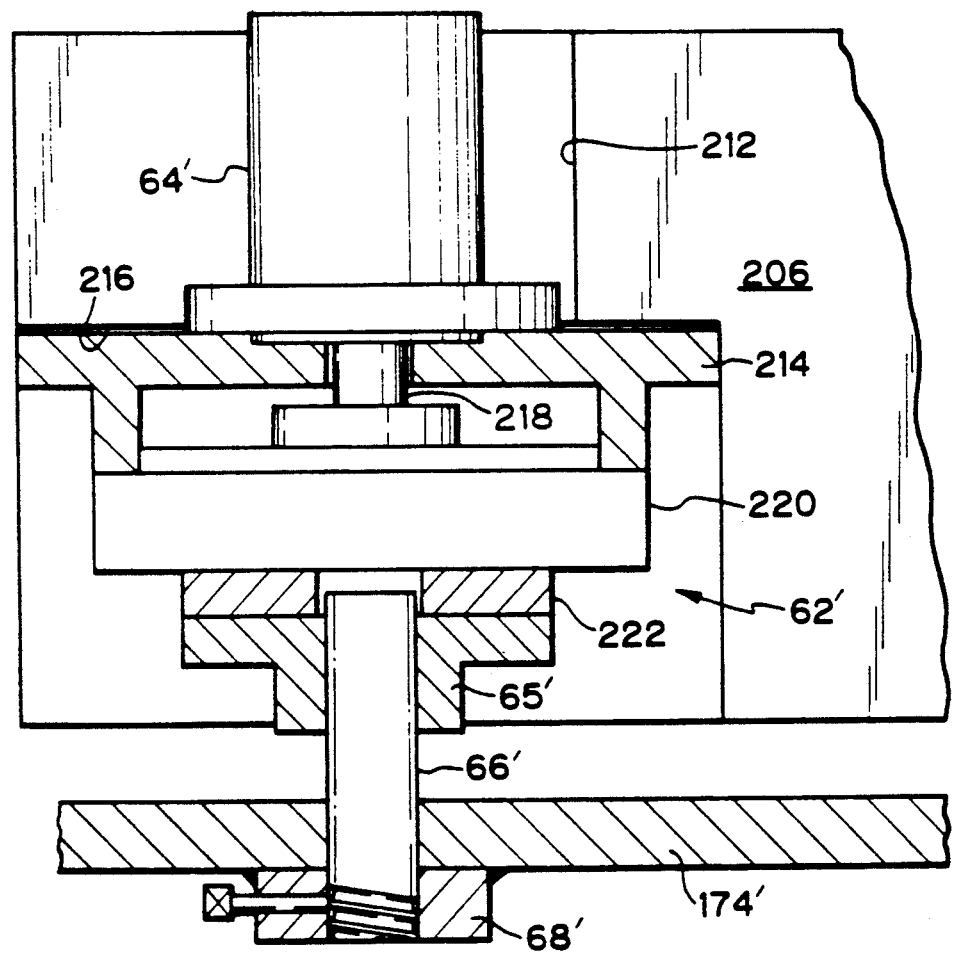
Figure 17:
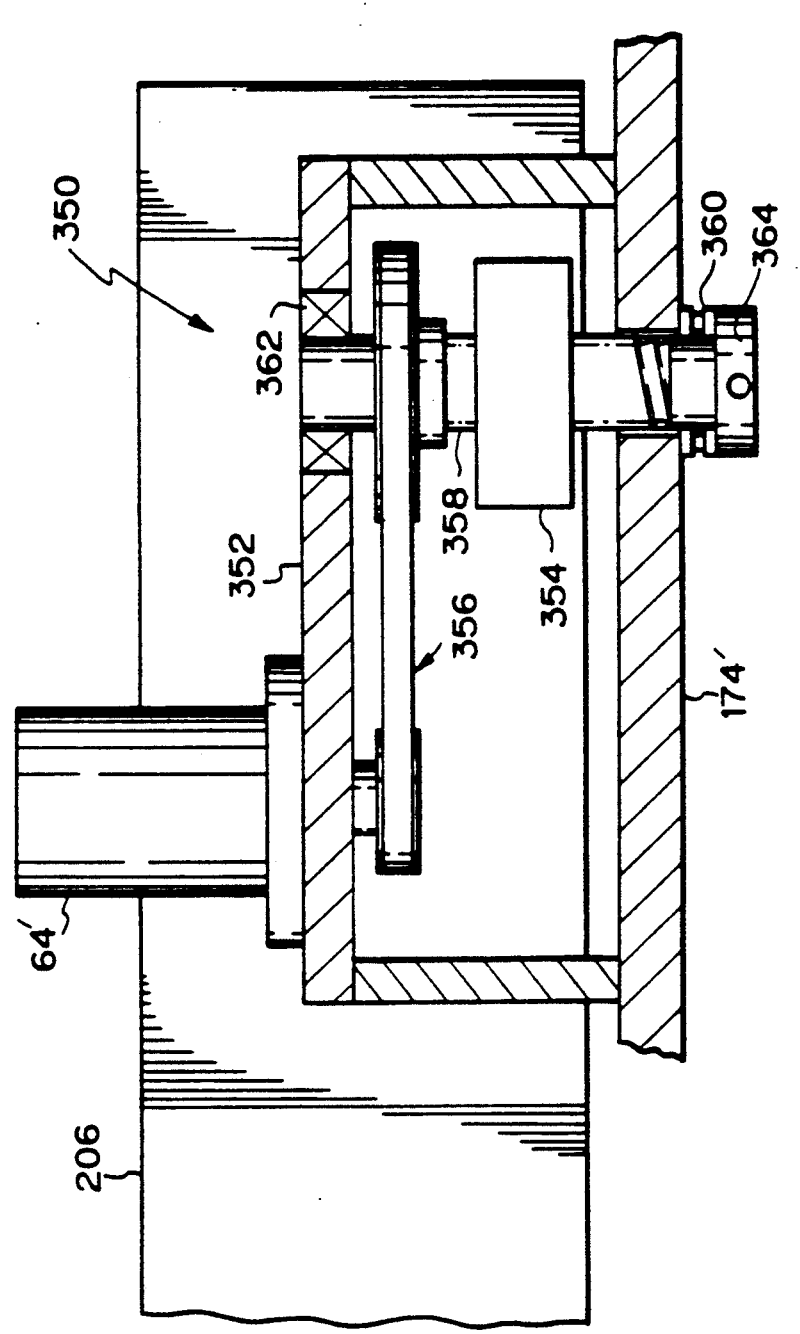

FIGS. 17 and 18 illustrate two alternative types of jack 62' to that illustrated in FIG. 16 described with reference to the apparatus 200 of FIGS. 10 to 13 but which may be used in any of the other described embodiments.

Referring to FIG. 17, the jack 350 is supported in a housing 352 secured to the carriage 174' and displaces a fixed nut 354 secured to the machine housing 206. The servo motor 64' is mounted on the jack housing 352 and drives a belt drive 356 to rotate a ball screw 358 journalled to the carriage 174' between a thrust race 360 and a plain bearing 362, with the fixed nut 354 threaded on the ball screw 358. A lock collar 364 on the ball screw 358 supports the thrust race 360. As before, appropriate stops may be provided to limit excessive movement of the machining station relative to the carriage due to failure of the control functions.

In FIG. 18, a pancake servo motor 366 replaces the motor 64' and is mounted on the carriage 174' with a direct drive to a rotatable nut 368 which cooperates with a stationary ball screw 370 which depends from the machine housing 206. The ball screw 370 is located by means of a lock screw 372. Optionally, a reduction gear box could be provided between the pancake motor and the drive nut. Once again, appropriate stops may optionally be provided to lift relative movement of the machine housing.

The jacks described with reference to FIGS. 17 and 18 all extend between the carriage or boom of the machining apparatus and the machine housing and are appropriate for use as such jacks in any of the previously described embodiments of the apparatus. Corresponding alternative drive arrangements may be used for the jack 224 for adjusting the machine head quill 226 in the machining station 178' of FIGS. 10 to 15.

Those skilled in the art will appreciate that the invention described herein is susceptible to variations and modifications other than those specifically described. It is to be understood that the invention includes all such variations and modifications which fall within its spirit and scope. In particular, the present invention has been described herein primarily with reference to a cutting head and a working plane of the cutting head. However, the invention is equally applicable to drilling and other machining functions which need not operate in or relative to a working plane, including possibly cutting or grinding. In general the apparatus of the invention is designed to provide an adjustment of the machine head to overcome inaccuracies in the support surface(s), and in the displacement of the optional carriage, as the machining head is displaced with the machining station about the apparatus, such inaccuracies being monitored relative to a reference. Where the apparatus is used for drilling, the drill bit may be axially adjustable relative to the remainder of the machine head.

I claim:

1. Apparatus for machining a workpiece, comprising a boom supported on a support structure, displacement means on the boom for enabling displacement of the boom relative to the support structure along a support surface or a plurality of parallel support surfaces, a machining station including a machine head, the machining station being carried by the boom on support means, and wherein the machining station support means comprises at least three adjustment means each of which is independently adjustable relative to the boom to move an associated portion of the machining station relatively towards or away from the support surface(s), the independent adjustment of each adjustment means being controlled by a respective sensor adapted to monitor movement of the associated portion of the machining station relative to a reference to counter inaccuracies in the support surface or surfaces as the boom is displaced thereamong which would produce inaccuracies in machining by the machine head.

2. Apparatus according to claim 1 wherein the support structure comprises a pivot about which the boom is rotatable, the machining station being mounted on the boom remote from the pivot and the displacement means support a remote end portion of the boom.

3. Apparatus according to claim 2 wherein the support surface comprises a surface of the workpiece.

4. Apparatus according to claim 2 wherein the boom is supported on the pivot by means of a self-aligning bearing.

5. Apparatus according to claim 2 wherein the displacement means comprise wheels or rollers whose axes of rotation extend along a radius from the boom pivot.

6. Apparatus according to claim 2 wherein the displacement means comprises two angularly spaced pairs of two wheels which are associated with respective sides of the boom.

7. Apparatus according to claim 1 wherein the support structure defines the support surface(s).

8. Apparatus according to claim 7 wherein the support structure comprises at least one pair of parallel rails.

9. Apparatus according to claim 1 wherein the support surface(s) extends substantially horizontally.

10. Apparatus according to claim 1 wherein the support surface(s) extends substantially vertically.

11. Apparatus according to claim 1 wherein the machining station is supported for displacement along the boom.

12. Apparatus according to claim 1 including a device for creating a precise beam of energy which is detectable by the sensor as the reference.

13. Apparatus according to claim 12 wherein said device is a laser source.

14. Apparatus according to claim 1 wherein each adjustment means comprises a servo motor mechanically driving a ball screw and nut assembly for adjusting the associated portion of the machining station.

15. Apparatus according to claim 14 wherein the mechanical drive is through a reduction gearbox.

16. Apparatus according to claim 1 wherein in use the machine head is axially fixed relative to the remainder of the machining station and the at least three adjustment means are associated with respective portions of the remainder of the machining station.

17. Apparatus according to claim 1 wherein one of the at least three adjustment means is adapted to axially adjust the position of the machine head relative to the remainder of the machining station, the support means includes a pivot, and the others of the at least three adjustment means are adapted to adjust the machining station about the pivot.

18. Apparatus according to claim 17 wherein resilient means is provided to resist pivotal movement of the machining station about the support means pivot due to the mass of the machining station.

* * * * *